(12) United States Patent
Jonas et al.

(10) Patent No.: US 10,948,590 B2
(45) Date of Patent: Mar. 16, 2021

(54) ESTIMATION AND COMPENSATION OF TRANSCEIVER POSITION OFFSETS IN A RADAR SYSTEM FOR TARGETS AT UNKNOWN POSITIONS

(71) Applicant: GM Global Technology Operations LLC, Detroit, MI (US)

(72) Inventors: Amnon Jonas, Jerusalem (IL); Oded Bialer, Petah Tivak (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 342 days.

(21) Appl. No.: 16/046,344

(22) Filed: Jul. 26, 2018

(65) Prior Publication Data
US 2020/0033469 A1 Jan. 30, 2020

(51) Int. Cl.
*G01S 13/931* (2020.01)
*G01S 13/48* (2006.01)
*G01S 13/46* (2006.01)

(52) U.S. Cl.
CPC ............ *G01S 13/931* (2013.01); *G01S 13/48* (2013.01); *G01S 2013/468* (2013.01)

(58) Field of Classification Search
CPC ........ G01S 7/40; G01S 7/4008; G01S 7/4021; G01S 7/4026; G01S 2007/403; G01S 2007/4034
See application file for complete search history.

(56) References Cited

U.S. PATENT DOCUMENTS

| | | | | |
|---|---|---|---|---|
| 5,012,249 A * | 4/1991 | Chan | ....................... | G01S 13/90 342/25 A |
| 5,977,906 A * | 11/1999 | Ameen | ................... | G01S 13/931 342/174 |
| 6,087,995 A * | 7/2000 | Grace | .................... | G01S 7/4017 340/903 |
| 6,750,811 B2 * | 6/2004 | Asanuma | .............. | G01S 13/931 342/174 |
| 7,548,189 B2 * | 6/2009 | Alon | ..................... | G01S 7/4026 342/149 |
| 7,681,448 B1 * | 3/2010 | Preston | .................. | B60W 40/11 73/432.1 |
| 8,880,001 B1 * | 11/2014 | Hwang | ................... | G01S 19/14 455/67.11 |
| 9,423,498 B1 * | 8/2016 | Brown | .................... | G01S 13/86 |
| 9,880,262 B2 * | 1/2018 | Hayakawa | ............. | G01P 15/00 |
| 2006/0119503 A1 * | 6/2006 | Allen | ..................... | H01Q 19/10 342/174 |
| 2007/0194982 A1 * | 8/2007 | Stove | .................... | G01S 7/4017 342/174 |
| 2008/0018524 A1 * | 1/2008 | Christianson | ......... | G01S 7/4026 342/75 |

(Continued)

*Primary Examiner* — Peter M Bythrow
(74) *Attorney, Agent, or Firm* — Cantor Colburn LLP

(57) ABSTRACT

A radar system includes two or more nodes. Each node includes one or more transmit antennas and one or more receive antennas. The radar system also includes a processor to obtain received signals at each of the two or more nodes, estimate an angle of arrival of each target identified based on the received signals, estimate an offset of each of the two or more nodes from a known location, and compensate for the offsets in the process of estimating the angle of arrival for subsequent targets in the received signals.

20 Claims, 3 Drawing Sheets

(56) References Cited

U.S. PATENT DOCUMENTS

| | | | |
|---|---|---|---|
| 2009/0046000 A1* | 2/2009 | Matsuoka | G01S 13/426 342/147 |
| 2013/0016003 A1* | 1/2013 | Stirling-Gallacher | G01S 13/89 342/174 |
| 2013/0207832 A1* | 8/2013 | Mizutani | G01S 7/4026 342/70 |
| 2013/0207833 A1* | 8/2013 | Mizutani | B60W 30/14 342/70 |
| 2013/0229300 A1* | 9/2013 | Izumi | G01S 13/931 342/156 |
| 2015/0247924 A1* | 9/2015 | Kishigami | G01S 13/931 342/70 |
| 2016/0003938 A1* | 1/2016 | Gazit | G01S 13/02 342/81 |
| 2016/0033254 A1* | 2/2016 | Zeine | G01S 11/00 307/104 |
| 2016/0124076 A1* | 5/2016 | Nakatani | G01S 13/931 342/174 |
| 2018/0321378 A1* | 11/2018 | Sudhakar | G01S 7/4026 |
| 2019/0107602 A1* | 4/2019 | Kitamura | G01S 13/584 |
| 2019/0279366 A1* | 9/2019 | Sick | G06K 9/6256 |

* cited by examiner

ESTIMATION AND COMPENSATION OF TRANSCEIVER POSITION OFFSETS IN A RADAR SYSTEM FOR TARGETS AT UNKNOWN POSITIONS

INTRODUCTION

The subject disclosure relates to the estimation and compensation of transceiver position offsets in a radar system for targets at unknown positions.

Vehicles (e.g., automobiles, trucks, construction equipment, farm equipment, automated manufacturing equipment) increasingly use sensors to detect objects in their vicinity. The detection may be used to augment or automate vehicle operation. Exemplary sensors include cameras, light detection and ranging (lidar) systems, radio detection and ranging (radar) systems. A radar system may include multiple transceivers, which are nodes that include one or more transmit antennas and one or more receive antennas. The multiple transceivers facilitate high angular resolution when the positions of the nodes are known. However, node positions may vary as the radar system operates over time due to many factors such as, for example, temperature, vibration, and mounting forces. In a calibration or test environment with a known target position, the offsets from original node positions may be determined. However, during normal operation of a radar system (e.g., a radar system in a vehicle), target positions are not known and this calibration process is not possible. Accordingly, it is desirable to provide estimation and compensation of transceiver position offsets in a radar system for targets at unknown positions.

SUMMARY

In one exemplary embodiment, a radar system includes two or more nodes. Each node includes one or more transmit antennas and one or more receive antennas. The radar system also includes a processor to obtain received signals at each of the two or more nodes, estimate an angle of arrival of each target identified based on the received signals, estimate an offset of each of the two or more nodes from a known location, and compensate for the offsets in the process of estimating the angle of arrival for subsequent targets in the received signals.

In addition to one or more of the features described herein, the processor estimates the angle of arrival based on a beamforming process that indicates amplitude at each azimuth angle in a field of view of the radar system.

In addition to one or more of the features described herein, the processor identifies point targets among the targets identified based on the received signals.

In addition to one or more of the features described herein, the processor estimates the offset of each of the two or more nodes from the known location based on the point targets.

In addition to one or more of the features described herein, the processor uses offset hypotheses to generate a synthetic array response corresponding with the estimate of the angle of arrival for each point target among the targets identified based on the received signals.

In addition to one or more of the features described herein, the processor determines the best-match offset hypothesis among the offset hypotheses that provide a best match between the synthetic array response and a measured array response according to the received signals.

In addition to one or more of the features described herein, the processor averages the best-match offset hypothesis associated with every point target to estimate the offset of each of the two or more nodes from the known location.

In addition to one or more of the features described herein, the radar system is in a vehicle.

In addition to one or more of the features described herein, the angle of arrival is used to augment or automate operation of the vehicle.

In another exemplary embodiment, a method of configuring a radar system includes transmitting from one or more transmit antennas of each of two or more nodes, and receiving received signals at one or more receive antennas of each of the two or more nodes. The method also includes estimating an angle of arrival of each target identified based on the received signals, estimating an offset of each of the two or more nodes from a known location, and compensating for the offsets in the process of estimating the angle of arrival for subsequent targets in the received signals.

In addition to one or more of the features described herein, the estimating the angle of arrival is based on a beamforming process that indicates amplitude at each azimuth angle in a field of view of the radar system.

In addition to one or more of the features described herein, the estimating the offset of each of the two or more nodes from the known location includes identifying point targets among the targets identified based on the received signals and using offset hypotheses to generate a synthetic array response corresponding with the estimate of the angle of arrival for each point target among the targets identified based on the received signals.

In addition to one or more of the features described herein, the method also includes determining the best-match offset hypothesis among the offset hypotheses that provide a best match between the synthetic array response and a measured array response according to the received signals, and averaging the best-match offset hypothesis associated with every point target to estimate the offset of each of the two or more nodes from the known location.

In yet another exemplary embodiment, a vehicle includes a radar system that includes two or more nodes. Each node including one or more transmit antennas and one or more receive antennas. The radar system also includes a processor to obtain received signals at each of the two or more nodes, estimate an angle of arrival of each target identified based on the received signals, estimate an offset of each of the two or more nodes from a known location, and compensate for the offsets in the process of estimating the angle of arrival for subsequent targets in the received signals. The vehicle also includes a vehicle controller to augment or automate operation of the vehicle based on the angle of arrival.

In addition to one or more of the features described herein, the processor estimates the angle of arrival based on a beamforming process that indicates amplitude at each azimuth angle in a field of view of the radar system.

In addition to one or more of the features described herein, the processor identifies point targets among the targets identified based on the received signals.

In addition to one or more of the features described herein, the processor estimates the offset of each of the two or more nodes from the known location based on the point targets.

In addition to one or more of the features described herein, the processor uses offset hypotheses to generate a synthetic array response corresponding with the estimate of the angle of arrival for each point target among the targets identified based on the received signals.

In addition to one or more of the features described herein, the processor determines the best-match offset hypothesis among the offset hypotheses that provide a best match between the synthetic array response and a measured array response according to the received signals.

In addition to one or more of the features described herein, the processor averages the best-match offset hypothesis associated with every point target to estimate the offset of each of the two or more nodes from the known location.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
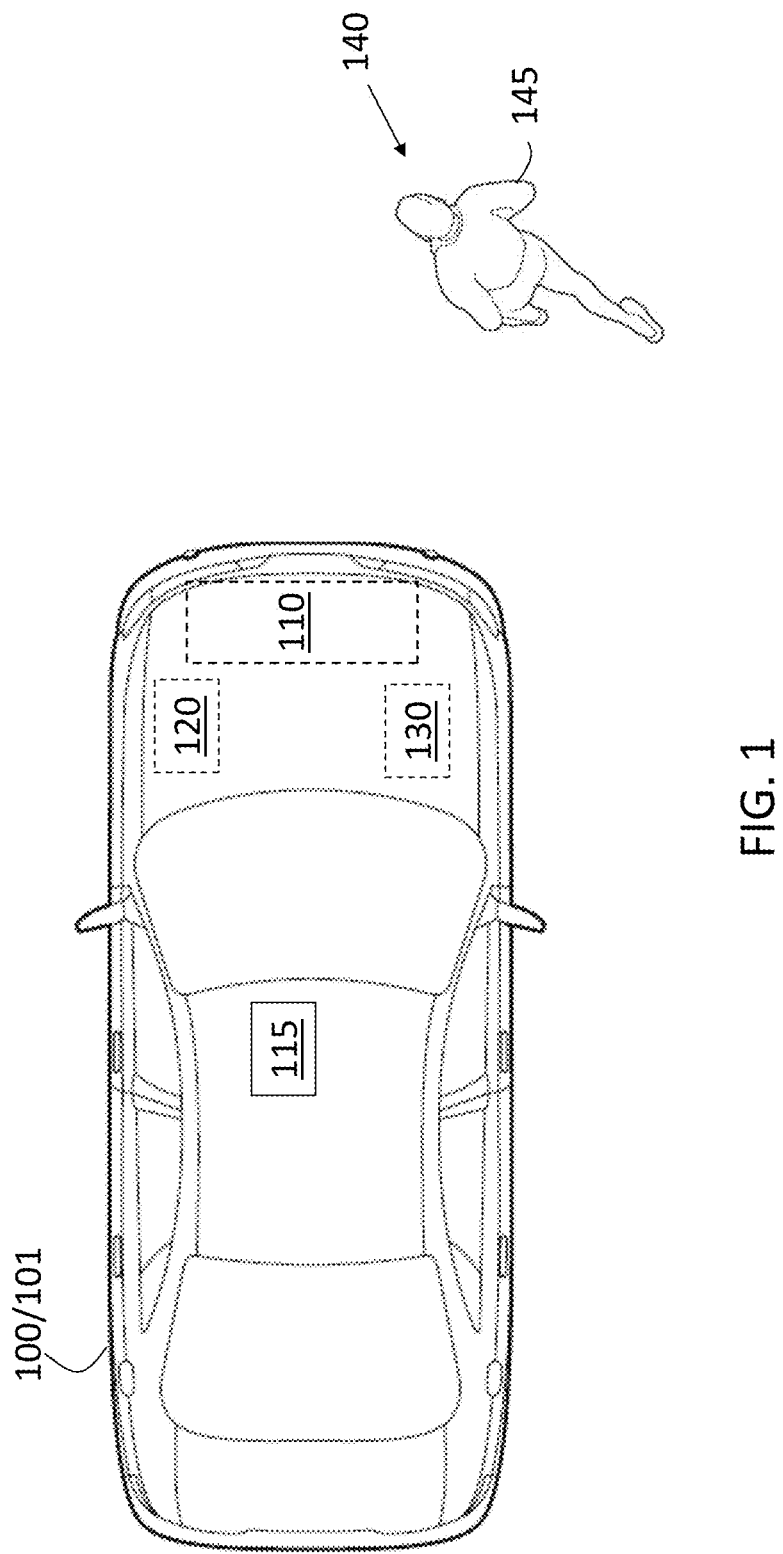
FIG. 1 is a block diagram of a scenario involving a radar system according to one or more embodiments.

The following description is merely exemplary in nature and is not intended to limit the present disclosure, its application or uses. It should be understood that throughout the drawings, corresponding reference numerals indicate like or corresponding parts and features.

In a radar system, a transmitter emits energy and, when one or more targets are in the field of view of the radar system, the targets reflect some of the energy, which may be captured by the radar system as a received signal. A radar system may include multiple transmit elements and multiple receive elements. Processing of the received signals provides information about the target such as range, Doppler, azimuth, elevation, and amplitude of each target. Angle of arrival may be estimated based on a known beamforming process. Digital beamforming involves obtaining a vector of complex scalars from the vector of received signals and the matrix of actual received signals at each receive element for each angle of arrival of a target reflection. Digital beamforming provides an azimuth angle (i.e., angle of arrival) to each of the detected targets based on a thresholding of the complex scalars of the obtained vector. The beamforming result may be indicated as azimuth angles along one axis and amplitude along the other axis in a two-dimensional graph. The main lobe (i.e., angle with the highest amplitude) indicates the angle of arrival of target. Other, lower amplitudes are referred to as side lobes.

As previously noted, multiple transceivers or nodes in a radar system facilitate determination of a target's position with higher angular resolution than a single node. However, offsets in the positions of the nodes from their original locations that develop during operation due to factors such as temperature and vibration, for example, reduce the accuracy of angle of arrival estimates. Determining these offsets in order to compensate for them and improve the target angle estimation typically requires using a target at a known position for calibration of the node positions. However, a calibration process requiring a target at a known position is challenging to perform during operation (e.g., while the radar system is operating in a vehicle). Embodiments of the systems and methods detailed herein relate to the estimation and compensation of transceiver position offsets in a radar system for targets at unknown positions. Specifically, for each node of the radar system, node rotation offset and node position offset is estimated using a process that involves collecting data for point targets.

Figure 2:
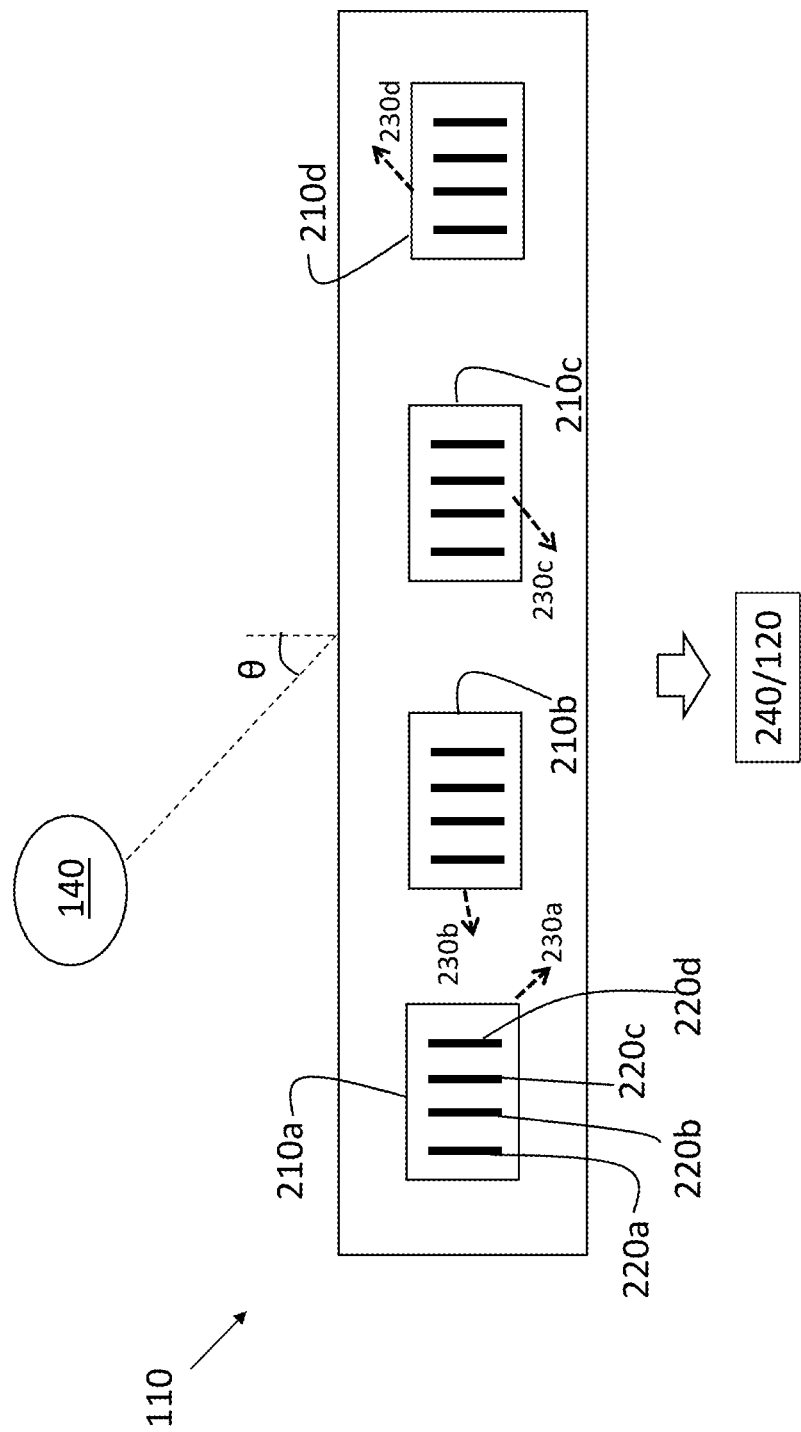
FIG. 2 details aspects of the radar system according to one or more embodiments.

In accordance with an exemplary embodiment, FIG. 1 is a block diagram of a scenario involving a radar system 110. The vehicle 100 shown in FIG. 1 is an automobile 101. A radar system 110, further detailed with reference to FIG. 2, is shown under the hood of the automobile 101. According to alternate or additional embodiments, one or more radar systems 110 may be located elsewhere in or on the vehicle 100. Another sensor 115 (e.g., camera, sonar, lidar system) is shown, as well. Information obtained by the radar system 110 and one or more other sensors 115 may be provided to a controller 120 (e.g., electronic control unit (ECU)) for image or data processing, target recognition, and subsequent vehicle control.

The controller 120 may use the information to control one or more vehicle systems 130. In an exemplary embodiment, the vehicle 100 may be an autonomous vehicle and the controller 120 may perform known vehicle operational control using information from the radar system 110 and other sources. In alternate embodiments, the controller 120 may augment vehicle operation using information from the radar system 110 and other sources as part of a known system (e.g., collision avoidance system, adaptive cruise control system, driver alert). The radar system 110 and one or more other sensors 115 may be used to detect objects 140, such as the pedestrian 145 shown in FIG. 1. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

FIG. 2 details aspects of the radar system 110 according to one or more embodiments. Four nodes 210a, 210b, 210c, 210d (generally referred to as 210) are shown for the exemplary radar system 110. Node 210a, for example, includes four antennas 220a, 220b, 220c, 220d (generally referred to as 220). Antenna 220a may transmit while antennas 220b, 220c, 220d receive. The exemplary configuration shown in FIG. 2 is not intended to limit the number of nodes 210, the number of antennas 220, or the number of antennas 220 that transmit or receive in a given node 210 of the radar system 110 that is processed according to one or more embodiments. The processing of the received signals may be done by a processor 240 that is part of the radar system 110. According to alternate or additional embodiments, the processing may be performed by the controller 120. The processor 240 may include processing circuitry similar to that of the controller 120. The offsets 230a, 230b 230c, 230d (generally 230) indicate exemplary offsets 230 experienced by the exemplary nodes 210 from their original (known) positions. The offsets 230 include a rotation from the original location, as well as a change in position.

A target 140 whose position is not known is shown in FIG. 2. The angle of arrival θ of the target 140 with respect to the center of the array of nodes 210 is of interest. The accuracy of the angle of arrival θ estimate obtained by the radar system 110 is affected by the offsets 230, thereby necessitating the estimation and compensation according to one or more embodiments. When the position of the nodes 210 is known, the result of performing beamforming on the reflections received at the nodes 210 is a narrow main lobe at the angle of arrival θ and low side lobe levels, relative to the main lobe. The offsets 230 result in higher side lobe levels. While this may have little effect on the result in a scenario involving a single target 140, the higher side lobes result in data related to targets 140 interfering with each other in a multi-target scenario.

Figure 3:
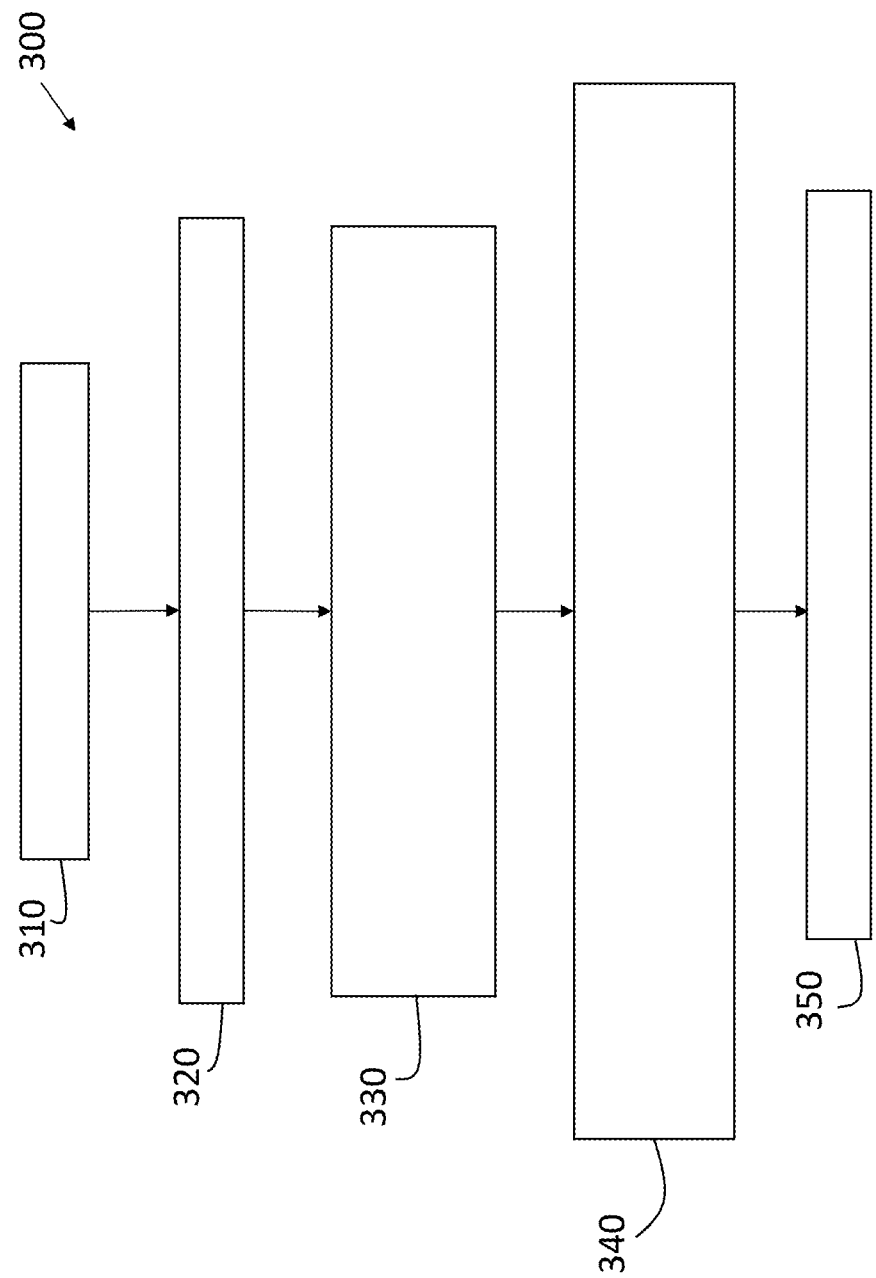
FIG. 3 is a process flow of a method of estimating and compensating for offsets in the positions of transceiver nodes in a radar system according to one or more embodiments.

FIG. 3 is a process flow of a method 300 of estimating and compensating for offsets 230 in the positions of transceiver nodes 210 in a radar system 110 according to one or more embodiments. At block 310, obtaining range of point targets includes identifying targets 140 as point targets based on beamforming results. That is, during the normal operation of the radar system 110, when the beamforming result (indicating angle versus amplitude) includes a single main lobe, then the associated target 140 is considered a point target. Estimating angle of arrival θ of each point target, at block 320, refers to using the beamforming process result to identify the angle associated with the highest amplitude.

At block 330, the processes include generating a synthetic array response corresponding with the estimated angle of arrival θ and using offset hypotheses. For each hypothesis regarding offsets 230 of the nodes 210, the angle of arrival θ estimate is used to generate the synthetic response of the array of nodes 210. At block 340, the synthetic response corresponding with each hypothesis of offsets 230 is compared with the actual measured array response. The processes include determining the hypothesis of offsets 230 for which the synthetic array response (from block 330) best matches the measured array response. This determination is averaged over a number M of point targets (e.g., on the order of a thousand point targets).

Specifically, according to an exemplary embodiment, the following optimization (i.e., minimization) may be used:

$$\hat{\theta}^{(1)}, \ldots, \hat{\theta}^{(N)}, \hat{\delta}^{(1)}, \ldots, \hat{\delta}^{(N)} = \text{argmin}_{\theta^{(1)}, \ldots, \theta^{(N)}, \delta^{(1)}, \ldots, \delta^{(N)}} \sum_{m=0}^{M-1} \sum_{n=1}^{N} \sum_{t=1}^{T} \sum_{r=1}^{R} \|X\|_2^2 \quad [\text{EQ. 1}]$$

$$X = S_{t,r}^{(n,m)} - \alpha e^{2\pi j \Delta_{t,r}^{(n,m)}(\theta^{(n)}, \delta^{(n)}, \delta_{target}^{m})} \quad [\text{EQ. 2}]$$

As previously noted, M indicates the number of point targets that are being averaged (i.e., m is the point target index). In addition, N is the number of nodes 210 (i.e., n is the node index), T is the number of antennas 220 per node 210 used to transmit (i.e., t is the transmit antenna index), and R is the number of antennas 220 per node 210 used to receive (i.e., r is the receive antenna index). $\hat{\theta}^{(n)}$ is the rotation aspect of the offset 230 for a given node 210n, which is a vector of three angles (yaw, pitch, tilt). $\hat{\delta}^{(n)}$ is the position offset 230 for the given node 210n. S indicates the measured signal, α is a gain factor that must be optimized. $\theta^{(n)}$ and $\delta^{(n)}$ are a hypothesis of the rotation and position offset 230 for the given node 210n, and $\delta_{target}^{m}$ is the estimated position of the target 140 (point target) according to the beamforming result. If a small percentage of the targets 140 that are regarded and used as a point target are actually multiple or distributed targets, the estimation and compensation processes shown in FIG. 3 are still viable.

As previously noted for block 340, and as indicated by the equations, the hypothesis of offsets 230 for which the synthetic array response matches the measured array response most closely is considered to be the best estimate of the offsets 230 of the nodes 210. The resulting offsets 230 for the nodes 210 are used in adjusting beamforming, at block 350. That is, at block 350, the processes include compensating for the estimated offset 230 for each node 210 (at block 340) in the beamforming used with subsequent received signals. The processes shown in FIG. 3 may be repeated continuously, periodically, or based on an event (e.g., by monitoring the result of the beamforming to detect a change in offsets 230). The number of point targets that are averaged, at block 340, may be fixed, may be based on a duration (e.g., average point targets detected over an hour), or may be set on another basis (e.g., by monitoring the result of the beamforming to detect a change in offsets 230).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A radar system, comprising:
   two or more nodes, each node including one or more transmit antennas and one or more receive antennas; and
   a processor configured to obtain received signals at each of the two or more nodes, estimate an angle of arrival of each target identified based on using the received signals at each of the two or more nodes together, estimate an offset of each of the two or more nodes from a known location at which relative location among the two or more nodes is known, and compensate for the offsets in the process of estimating the angle of arrival for subsequent targets using the received signals at each of the two or more nodes together.

2. The radar system according to claim 1, wherein the processor is further configured to estimate the angle of arrival based on a beamforming process that indicates amplitude at each azimuth angle in a field of view of the radar system.

3. The radar system according to claim 1, wherein the processor is further configured to identify point targets among the targets identified based on the received signals.

4. The radar system according to claim 3, wherein the processor is further configured to estimate the offset of each of the two or more nodes from the known location based on the point targets.

5. The radar system according to claim 4, wherein the processor is further configured to use offset hypotheses to generate a synthetic array response corresponding with the estimate of the angle of arrival for each point target among the targets identified based on the received signals.

6. The radar system according to claim 5, wherein the processor is further configured to determine the best-match offset hypothesis among the offset hypotheses that provide a best match between the synthetic array response and a measured array response according to the received signals.

7. The radar system according to claim 6, wherein the processor is further configured to average the best-match offset hypothesis associated with every point target to estimate the offset of each of the two or more nodes from the known location.

8. The radar system according to claim 1, wherein the radar system is in a vehicle.

9. The radar system according to claim 8, wherein the angle of arrival is used to augment or automate operation of the vehicle.

10. A method of configuring a radar system, the method comprising:

transmitting from one or more transmit antennas of each of two or more nodes;

receiving received signals at one or more receive antennas of each of the two or more nodes;

estimating, using a processor, an angle of arrival of each target identified based on using the received signals at each of the two or more nodes together;

estimating, using the processor, an offset of each of the two or more nodes from a known location at which relative location among the two or more nodes is known; and compensating, using the processor, for the offsets in the process of estimating the angle of arrival for subsequent targets using the received signals at each of the two or more nodes together.

11. The method according to claim 10, wherein the estimating the angle of arrival is based on a beamforming process that indicates amplitude at each azimuth angle in a field of view of the radar system.

12. The method according to claim 10, wherein the estimating the offset of each of the two or more nodes from the known location includes identifying point targets among the targets identified based on the received signals and using offset hypotheses to generate a synthetic array response corresponding with the estimate of the angle of arrival for each point target among the targets identified based on the received signals.

13. The method according to claim 12, further comprising determining the best-match offset hypothesis among the offset hypotheses that provide a best match between the synthetic array response and a measured array response according to the received signals, and averaging the best-match offset hypothesis associated with every point target to estimate the offset of each of the two or more nodes from the known location.

14. A vehicle, comprising:
a radar system comprising:
two or more nodes, each node including one or more transmit antennas and one or more receive antennas; and a processor configured to obtain received signals at each of the two or more nodes, estimate an angle of arrival of each target identified based on using the received signals at each of the two or more nodes together, estimate an offset of each of the two or more nodes from a known location at which relative location among the two or more nodes is known, and compensate for the offsets in the process of estimating the angle of arrival for subsequent targets using the received signals at each of the two or more nodes together; and a vehicle controller configured to augment or automate operation of the vehicle based on the angle of arrival.

15. The vehicle according to claim 14, wherein the processor is further configured to estimate the angle of arrival based on a beamforming process that indicates amplitude at each azimuth angle in a field of view of the radar system.

16. The vehicle according to claim 14, wherein the processor is further configured to identify point targets among the targets identified based on the received signals.

17. The vehicle according to claim 16, wherein the processor is further configured to estimate the offset of each of the two or more nodes from the known location based on the point targets.

18. The vehicle according to claim 17, wherein the processor is further configured to use offset hypotheses to generate a synthetic array response corresponding with the estimate of the angle of arrival for each point target among the targets identified based on the received signals.

19. The vehicle according to claim 18, wherein the processor is further configured to determine the best-match offset hypothesis among the offset hypotheses that provide a best match between the synthetic array response and a measured array response according to the received signals.

20. The vehicle according to claim 19, wherein the processor is further configured to average the best-match offset hypothesis associated with every point target to estimate the offset of each of the two or more nodes from the known location.

* * * * *